United States Patent
Mersky et al.

[11] Patent Number: 5,455,842
[45] Date of Patent: Oct. 3, 1995

[54] METHOD AND APPARATUS FOR UNDERWATER COMMUNICATION

[76] Inventors: Barry Mersky, 15521 Penny Royal La., Rockville, Md. 20853; Van P. Thompson, 2 Shorewalk Dr., Riva, Md. 21140

[21] Appl. No.: 181,149

[22] Filed: Jan. 12, 1994

[51] Int. Cl.$^6$ .......................... H04M 1/60; H04R 25/00; H04B 11/00; H04B 13/02
[52] U.S. Cl. .......................... 375/175; 381/68.3; 381/151; 340/850; 128/200.29; 362/132
[58] Field of Search .......................... 379/175; 381/68.3, 381/151; 128/200.24; 340/850; 267/130, 131, 132

[56] References Cited

U.S. PATENT DOCUMENTS

| | | |
|---|---|---|
| 221,892 | 11/1879 | Bostwick . |
| 228,254 | 6/1980 | Fiske . |
| 608,255 | 8/1898 | Gardner . |
| 1,521,287 | 12/1924 | Gernsback . |
| 1,660,272 | 2/1928 | Penney . |
| 1,763,103 | 6/1930 | Phipps . |
| 1,961,835 | 6/1934 | Veilleux . |
| 1,986,955 | 1/1935 | Bedell . |
| 2,161,169 | 6/1939 | Jefferis, Jr. . |
| 2,167,377 | 7/1939 | Schwencke . |
| 2,230,397 | 2/1941 | Abraham . |
| 3,746,789 | 7/1973 | Alcivar .................................... 375/175 |
| 4,039,999 | 8/1977 | Weston .................................... 340/850 |
| 4,071,110 | 1/1978 | Payne . |
| 4,979,516 | 12/1990 | Abraham, II . |
| 5,031,611 | 7/1991 | Moles . |
| 5,033,999 | 7/1991 | Mersky . |
| 5,048,519 | 9/1991 | Kasama et al. . |

OTHER PUBLICATIONS

Austin Brouns, "Experimental Wide–Band with Tooth–contact Microphone", Jan. 1971, p. 11.

*Primary Examiner*—Stephen Chin
*Assistant Examiner*—Paul Loomis

[57] ABSTRACT

Waterborne acoustic signals are received and processed into electrical driver signals to energize a transducer held in selectively controllable vibration-transmitting engagement with a tooth of an underwater diver. The transducer converts the electrical signals into low amplitude sound-associated vibrations imparted to the tooth, through the jawbone and scull to the cochlea for processing into electrical signals carried to the brain and perceived as intelligible sound. The addition of conventional broadcast means permits two-way underwater communication. The transducer can be labially or occlusively mounted, preferably against an upper or maxillary tooth and the force of engagement between the transducer and the tooth is at least partially controlled by the diver to optimize communication characteristics.

22 Claims, 2 Drawing Sheets

METHOD AND APPARATUS FOR UNDERWATER COMMUNICATION

BACKGROUND OF THE INVENTION

1. Technical Field

The present invention pertains to methods and apparatus for underwater communication and, more particularly, to the transmission of acoustic vibrations to the cochlea through a tooth of a diver.

2. Discussion of the Prior Art

Communication among divers and between divers and surface support personnel is essential to the efficiency and safety of virtually all undersea operations. Elaborate systems of hand signals have been used where light and distance permits but the range of utility is small. Coded pulses offer more range but are inadequately slow and distracting. One approach to voice communication has been developed that transmits mechanically generated acoustic sound energy directly through the water to intended receivers. A second approach has been to use electronics to transfer signals, by direct wire through ultrasonics or electromagnetic radiation.

Mechanical systems of underwater voice communication must provide an impedance match between the acoustic energy of the speaker's voice and the acoustic energy generated in the water for sound transmission, as described for example, by U.S. Pat. No. 4,071,110 (Payne). The unamplified range of such devices is limited and both the comfort of the diver and the intelligibility of the communication are compromised by the requirement that a bit or rigid mouthpiece, for instance a metal rod, be gripped or clenched tightly by the teeth of the diver in order to properly transmit and receive audio signals.

Existing electronic underwater communications systems require that both the ears and mouth are surrounded by air. The bulkiness of the air-conduction earphones and the distortion resulting from the interaction of underwater pressure on the air column in the outer human ear have hindered the usefulness and acceptance of these devices.

An alternative approach, imparting vibrations to the skull for osseus transmission through the skull bones to the cochlea, and hence as signals via the auditory nerve to the brain, is exemplified by U.S. Pat. No. 5,033,999 (Mersky). That bone conduction device uses the teeth as the input site into the skull. Such tooth related devices have not been intended or adapted for use with an underwater breathing apparatus, however, instead having focused on the advantage of repeatable skull coupling to achieve better speech intelligibility, comfort and improved cosmetics. The issues inherent to maintaining an efficient and effective vibration-transmitting engagement between the tooth and the vibration input device without placing unacceptably distracting demands on the diver while simultaneously permitting intelligible articulation despite the intrusion of breathing support apparatus has not been addressed.

OBJECTS AND SUMMARY OF THE INVENTION

It is an object of the present invention to provide a method and apparatus that overcomes the above mentioned shortcomings and disadvantages of the prior art by providing for underwater communication reception transmitted through tooth and bone structure.

It is another object of the present invention to provide a method and apparatus for efficiently transmitting sound-associated vibrations to the ear of a diver via bone structure without interfering with the ability to clearly and intelligibly articulate words.

A further object of the present invention is to provide a method and apparatus for providing a comfortable yet efficient selectively adjustable vibration-transmitting engagement between a tooth of a diver and a vibration-imparting transducer.

It is also an object of the present invention to provide an electrical connector plug for interchangeably interfacing externally-mounted underwater sound receiver-transmitter and signal processing components with microphone and vibration-imparting transducer components housed within the mouthpiece of a diver.

Some of the advantages of the present invention over the prior art are that an underwater diver can enjoy hands free selectively controllable voice communication, clearly and intelligibly perceived without significant interference with the ability to enunciate and without the inconvenience and discomfort of earplugs or earphones. The device and method of the present invention are well suited to compact configuration, modular interchangeability and inexpensive manufacture.

In accordance with one aspect of the present invention, a transducer for imparting low amplitude vibrations in the audible frequency range is mounted in the mouthpiece of the breathing apparatus of an underwater diver. The transducer is held in adjustable vibration-transmitting engagement with a maxillary tooth by the muscle control of the lips, tongue and bite of the diver. These vibrations are transferred from the teeth via bone structures to the ear of the diver to be perceived as intelligible sound. A microphone mounted externally of the mouth but within the air chamber of the mouthpiece converts spoken communication of the diver into electrical signals transmitted through the connector plug to external processor and transmission means.

In an alternative embodiment of the invention, the vibration-transmitting transducer is embedded in a bite plane of the mouthpiece and the engagement force between the teeth and the transducer is selectively controlled by the bite pressure exerted by the diver.

These and other objects, features and many of the attendant advantages of the present invention will be appreciated more readily as they become better understood from the reading of the following description considered in connection with the accompanying drawings wherein like parts in each of the several figures are identified by the same reference numerals.

DESCRIPTION OF THE PREFERRED EMBODIMENTS

Figure 1:
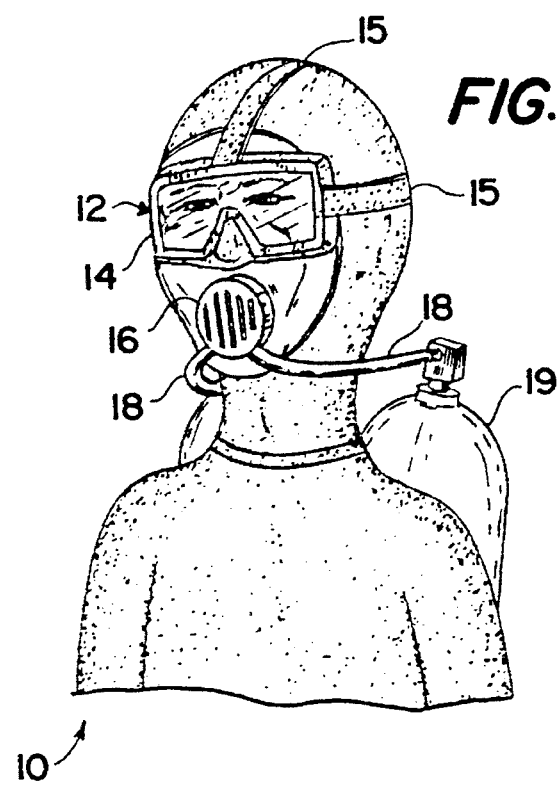
FIG. 1 is a perspective view of a diver wearing goggles and an underwater breathing device incorporating a mouthpiece constructed according to the present invention.
Figure 2:
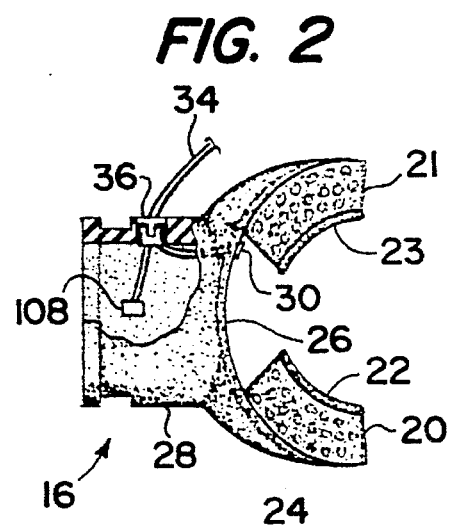
FIG. 2 is a top view in plan and partial section of the mouthpiece of the present invention.

A scuba diver 10 is shown in FIG. 1 wearing a facemask assembly 12 comprising goggles 14 held against the face of the diver by elastic straps 15. A mouthpiece 16 is adapted to supply the diver with oxygen and remove carbon dioxide through hoses 18 communicating with pressure tanks 19 and one or more regulator valves, not shown. The mouthpiece 16 is described herein with terms such as "vertical" and "horizontal" with reference to the mouthpiece oriented in the mouth of a diver whose head is in an upright position. The mouthpiece includes an outer, labial flange 24 aligned generally vertically and extending arcuately on each side of the mouth to reside in the labial space between the teeth and lips or cheek of the diver, as shown in FIG. 2. Projecting inwardly from the inner side of labial flange 24 toward the tongue or lingual side of the mouth along the occlusal plane are left and right horizontal bite plates 20 and 21, respectively, arranged to be engaged between the diver's upper, or maxillary, and lower, or mandibular, teeth. The inner edges of bite plates 20 and 21 terminate in vertical lips 22 and 23, respectively, positioned to reside adjacent the interior surfaces of the engaging teeth. Centrally located between bite plates 20 and 21, the forward portion of labial flange 24 has an air passageway, or through hole 26, defined therein. The outside surface of the forward portion of flange 24 has a forwardly-extending air tube 28 of generally oval cross-section. The lips of the diver sealingly encircle air tube 28, simultaneously exerting rearward pressure on flange 24 urging it against the teeth and gums. The interior of air tube 28 defines a forward extension of passage 26.

Figure 3:
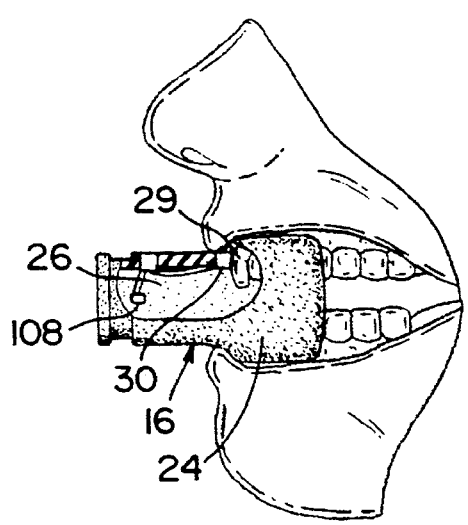
FIG. 3 is a side elevation view in section of the mouthpiece of the present invention shown in the mouth of a diver.
Figure 4:
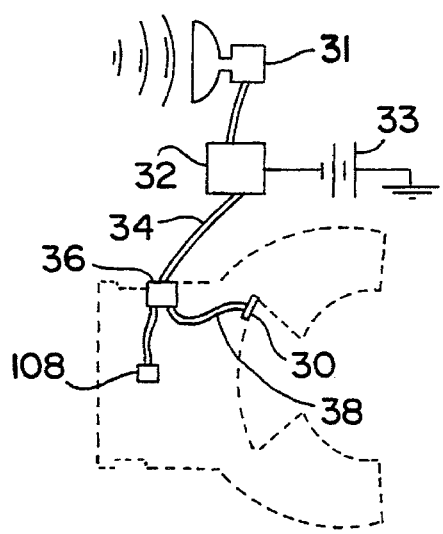
FIG. 4 is an electrical schematic diagram of the communication system of the present invention.

A transducer 30 is mounted on the inner side of flange 24 above air passageway 26 in a position adjacent the bucco-labial or outward non-bearing surface of at least one of the diver's maxillary incisors 29 as shown in FIG. 3. Acoustic communication signals transmitted through the water, as represented schematically in FIG. 4, are collected by a receiver or receiver-transmitter 31, for example, a hydrophone, converted into audio driver signals by amplifier-processor 32, energized by power source 33 and conducted to transducer 30 via leads 34, connector plug 36 and conductors 38.

Figure 5:
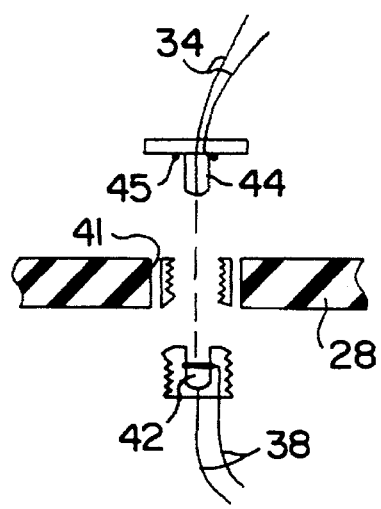
FIG. 5 is an exploded side view of the connector arrangement of the present invention.

Connector plug 36, shown in detail in FIG. 5, comprises an internally threaded cylinder 40 water-tightly cemented into a circular hole 41 defined transversely through one side of air tube 28. An externally threaded female connector 42 is received and engaged within the cylinder, and a male connector 44 is received and engagable in a friction fit within female connector 42. Male connector 44 is attached to leads 34 from the signal processor, and female connector 42 is attached to transducer 30 by conductors 38. An O-ring 45 encircles male connector 44 and forms a watertight seal between the mated male connector 44 and female connector 42. The male and female connectors 44 and 42, respectively, are of conventional design. The connector configuration of connector plug 36 provides a convenient and effective interface for selectively attaching alternative or modular components to the communication system of the present invention.

The audio driver signals generated by amplifier-processor 32 are converted by transducer 30 into sound-associated vibrations imparted to the tooth and transmitted via bone structure to the cochlea for conversion to electrical signals carried by the auditory nerve to the brain of the swimmer and perceived as sound. Transducer 30 is urged into vibration-transmitting engagement with the adjacent incisor by the diver's oro-facial muscles acting against the outer surface of mouthpiece flange 24 and by the compressive force of the diver's bite against bite plates 20 and 21 flexing and drawing flange 24 inward.

Figure 6:
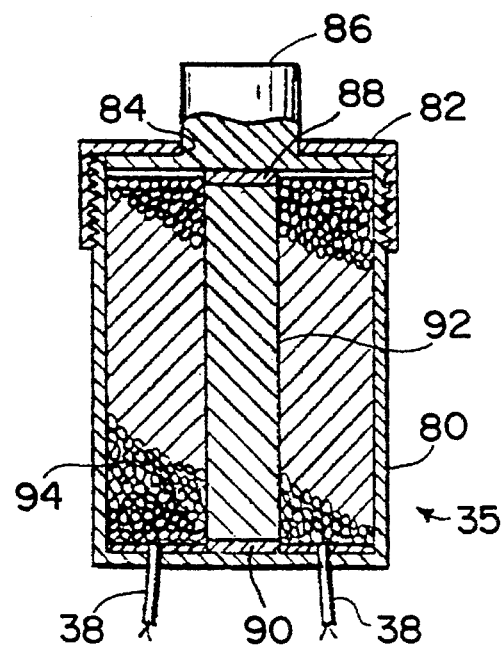
FIG. 6 is a view in elevation and partial section of a magnetostrictive transducer that can be employed in the present invention.

In the preferred embodiment, transducer 30 transmits low amplitude vibrations through the changes in length of a highly magnetostrictive rod. These dimensional changes are induced by cyclical magnetic field fluctuations applied in response to variable amplitude input driver signals. Described in detail in U.S. patent application Ser. No. 08/111,527 (Mersky et al), incorporated herein by reference, a magnetostrictive transducer 35 compatible with the present invention is shown in FIG. 6. Transducer 35 includes a magnetically permeable open cylindrical housing 80 externally threaded on one end to engage internally threaded end cap 82, cup-like in configuration and having a central aperture 84. A flanged, circular vibration coupler, or activator 86, extends through aperture 84 and is supported at top and bottom by disc-shaped permanent magnets 88 and 90, respectively. The magnets transmit vibrations resulting from the change in length of an axially disposed rod 92 of magnetostrictive material, for example Terfenol-D, surrounded within housing 80 by a tightly wound coil 94 of insulated conductor. Rod 92 changes length in response to varying magnetic field strengths generated by coil 94 and driven at sound-related frequencies by an external signal driver via conductors 38.

The axis of vibration for each of these transducer embodiments is generally normal to the long axis of the tooth. The transducer is held in contact with the tooth by the urging of the lips, tongue and bite of the diver against the mouthpiece 16.

A conventional non-floodable microphone transducer 108 may be mounted in the air passageway 26 of the mouthpiece 16 external to the lips and mouth of the diver as shown in FIGS. 2 and 3. Transducer 108 is connected through female connector 42 and connector plug 36 to external amplifier power, signal processing and transmission means, as shown in FIG. 4, and allows the present invention to be used for two-way communication. The non-bearing surface placement of transducer 30 permits relatively unimpeded lip, tongue and tooth movement to support clear and intelligible articulation for spoken communication.

Figure 7:
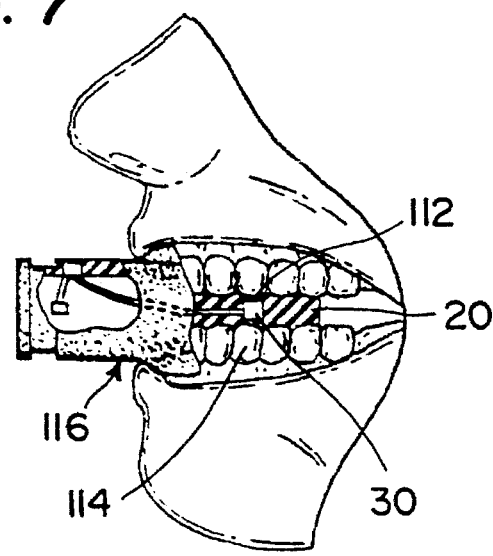
FIG. 7 is a side elevation view in section of a transducer of the present invention embedded in a mouthpiece bite plate shown in the mouth of a diver.

In an alternative embodiment transducer 30 is embedded in an occlusal bite plate 20 or 21, of the mouthpiece 116, shown in FIG. 7. Vibration-transmitting engagement is made between the transducer 30 and the bearing or occlusal surface 112 of canine or premolar teeth 114 by the voluntary and selectively controllable force exerted by the diver in clenching the bite plate between the teeth of the opposing upper and lower arches. Although some loss of word-forming flexibility attends the requirement of bearingly gripping the bite plate with the wearer's teeth, the selectable force exerted allows the diver to control the level of vibration transmission and hence the quality and amplitude of received communication. Moreover, the grip on the bite plate ideally held in generally rigid engagement by the bite of the diver during reception to assure distinct vibration-transmitting engagement with the receptor tooth, can be relaxed during transmission, at the expense of reception, of course, to facilitate word-forming.

In use the diver selects a mouthpiece according to the present invention having the type and location of vibration-imparting, transducer of choice, and attaches a selected suite of external components, (i.e., transmitter-receiver, an antenna, a signal processor and a power source) through the connector plug interface. The diver can selectively adjust the force applied between the transducer and receptor tooth to accommodate changes in diving conditions. Moreover the muscle urging of the mouthpiece against the tooth can be relaxed periodically, especially during periods of minimum communication demands, to avoid muscle fatigue. Signals transmitted through the water are received and transformed into electrical driver signals by conventional means, then transferred to the vibration-imparting transducer and converted into low amplitude vibrations that transmit through the tooth, jaw and skull bones to the cochlea. The cochlea transforms incident vibrations into electrical signals carried by the auditory nerve to the brain for perception as sound and speech. As necessary the diver can speak into a microphone mounted in the air tube forward of and outside the teeth. The microphone transducer transforms input vibrations transmitted as sound through the air in the mouthpiece or, alternatively, as vibrations through the mouthpiece structure, into electrical signals which can be amplified and transferred to conventional broadcast means to complete the interactive cycle of communication.

At any time the diver can relax the force exerted between the transducer and the tooth to vary the efficiency of the vibration-transmitting engagement and correspondingly change the perceived sound level. Similarly, relaxation of the mouthpiece may reduce the pressure-sensitivity of the microphone.

The present invention presents several advantages over prior art underwater communication devices. Osseus transmission of sound avoids the frequently encountered auditory problems associated with diving pressures. The awkward and uncomfortable aspects of either earphones or earplugs are avoided and a significant amount of hands-free control is provided in the volume of sound received, allowing the diver to detach himself from interference, static or unwanted communication by reducing the voluntary force applied between the transducer and the tooth. Moreover, the unique connector plug supports a quickly reconfigurable modular communication system, and the inexpensive manufacture of the mouthpiece permits affordable customization of the fit and location of the transducer to optimize "sound" perception. The collocation of both vocalization and auditory perception permits the development of consolidated compact communication apparatus.

Having described preferred embodiments of a new and improved method and apparatus for transmitting clearly intelligible underwater voice communication through one or more teeth of a diver in accordance with the present invention, it is believed that other modifications, variations and changes will be suggested to those skilled in the art in view of the teachings sets forth herein and that all such variations, modifications and changes fall within the scope of the present invention. It is therefore to be understood that the subject matter discussed above and illustrated in the accompanying drawings are illustrative and not limiting.

What is claimed is:

1. Apparatus for communicating sound-related vibrations to the cochlea of an underwater diver comprising:

a mouthpiece for use in underwater breathing apparatus;

means for receiving acoustic signals and converting said acoustic signals to electrical audio driver signals;

transducer means mounted in said mouthpiece and adapted to be held in selectively compressible vibration-transmitting engagement with a surface of a tooth of the diver and responsive to said input electrical audio driver signals for imparting corresponding vibratory signals to said tooth and hence to the ear and cochlea of the diver via facial bone structure;

wherein said transducer means includes a magnetostrictive rod member responsive to a varying magnetic field passing therethrough for expanding and contracting in size in response to variations in said field, an electrical coil responsive to variable amplitude electrical current passing therethrough for creating a varying electromagnetic field passing through said rod, thereby causing said rod to expand and contract in size with variations in the current amplitude, and an actuator in direct contact with said rod such that said actuator vibrates as a function of the size expansions and contractions of said rod;

engagement means for holding said rod in said vibration-transmitting engagement with said tooth surface; and connecting means for delivering said input electrical audio driver signals to said electrical coil.

2. Apparatus for communicating sound-related vibrations to the cochlea of an underwater diver comprising a mouthpiece for use in underwater breathing apparatus;

means for receiving acoustic signals and converting said acoustic signals to electrical audio driver signals;

transducer means mounted in said mouthpiece and adapted to be held in selectively compressible vibration-transmitting engagement with a surface of a tooth of the diver and responsive to said input electrical audio driver signals for imparting corresponding vibratory signals to said tooth and hence to the ear and cochlea of the diver via facial bone structure;

wherein said transducer means is a piezoelectric crystal transducer.

3. The apparatus according to claim 1 wherein said engagement means comprises means for holding said transducer in said vibration-transmitting engagement with the buccolabial side of a tooth of the diver.

4. The apparatus according to claim 1 wherein said engagement means are teeth of opposing upper and lower arches in occlusion with said vibration-transmitting transducer.

5. The apparatus according to claim 1 wherein said engagement means comprises means for holding said transducer in said vibration-transmitting engagement with an incisor.

6. The apparatus according to claim 1 wherein said engagement means comprises means for holding said transducer in said vibration-transmitting engagement with a maxillary tooth.

7. The apparatus according to claim 1 wherein said transducer means is mounted in the mouthpiece of a scuba device.

8. The apparatus according to claim 1 wherein said transducer means is mounted in the mouthpiece of a snorkel device.

9. The apparatus according to claim 1 wherein said connecting means comprises:

a hole defined in the forwardly extending tube portion of said mouthpiece;

an internally threaded open cylinder rigidly and watertightly mounted in said hole;

a female connector having external threads to engage said internally threaded open cylinder;

conductors extending from said female connector to said transducer means;

a male connector conductively and watertightly receivable into said female connector; and conductors extending from said male connector to said means for receiving and converting said acoustic signal.

10. The apparatus according to claim 1 wherein said engagement means comprises means for holding said transducer in said vibration-transmitting engagement with the lingual side of a tooth of the diver.

11. The apparatus according to claim 1 further comprising a microphone transducer means mounted external to and forwardly of the mouth of the diver in the forwardly-extending air tube portion of said mouthpiece for converting sound emanating from the diver's mouth to output electrical signals, and connecting means for delivering said output signals to broadcast transmission means.

12. The apparatus according to claim 1 wherein said mouthpiece includes a labial flange extending arcuately on each side of the mouth and said flange includes:

a rigid outer surface for exerting and transmitting orofacial pressure against said transducer means; and a soft inner portion for comfortably engaging the teeth of the diver.

13. A method for an underwater diver to receive underwater communication comprising the steps of:

(a) mounting a transducer in the mouthpiece of an underwater breathing device in selectively compressible vibration-transmitting contact with a surface of a tooth of the diver;

(b) transmitting input electrical audio driver signals from an underwater acoustic receiver to said transducer;

(c) converting said input signals to output sound-related vibrations via said transducer; and (d) imparting said vibrations to said tooth surface for osseous conduction to the cochlea.

14. The method of claim 13 further comprising the steps of:

(e) mounting a microphone for converting soundwaves into electrical signals in said mouthpiece external to and in front of the mouth of the diver;

(f) transmitting said microphone electrical signals to a transducer means for converting said microphone electrical signals into acoustic vibrations for transmitting into water; and (g) transmitting said acoustic vibrations into the water.

15. The apparatus according to claim 1 wherein said surface of a tooth is a non-bearing surface.

16. The apparatus according to claim 15 wherein said engagement means for holding said transducer means in said vibration-transmitting engagement with said non-bearing tooth surface is positioned to permit unrestricted tongue and teeth manipulation for speech articulation.

17. The method of claim 13 further comprising the step of attaching said receiver to the diver.

18. Apparatus for communicating sound to the cochlea of a person comprising:

a mouthpiece adapted to fit between and be engaged by the person's maxillary and mandibular teeth;

a transducer mounted in said mouthpiece for selectively compressible engagement with at least one tooth by muscles of the person and responsive to electrical audio driver signals applied thereto for imparting corresponding vibratory signals to said tooth for transmission through bone structure to the cochlea of the person; and means for applying electrical audio driver signals to said transducer.

19. The apparatus according to claim 18 wherein said transducer means comprises a magnetostrictive member responsive to a varying magnetic field passing therethrough for expanding and contracting in size in response to variations in said field;

an electrical coil responsive to variable amplitude electrical current passing therethrough for creating a varying electromagnetic field passing through said rod, thereby causing said rod to expand and contract in size with variations in the current amplitude;

an actuator in direct contact with said rod such that said actuator vibrates as a function of the size expansions and contractions of said rod; and coupling means for conducting vibrations from said actuator to said tooth.

20. The apparatus of claim 18 wherein said at least one tooth comprises opposing upper and lower arches in occlusion with said vibration-transmitting transducer.

21. A method of transmitting sound to the cochlea of a person comprising the steps of:

(a) disposing a mouthpiece in the persons's mouth for selectively compressible retention between the person's mandibular and maxillary teeth;

(b) mounting a transducer in said mouthpiece for compressible contact against a surface of a tooth of the person as a function of said selectively compressible retention;

(c) applying electrical audio driver signals to said transducer; and (d) with said transducer, converting the driver signal to corresponding mechanical vibrations and applying said vibrations to said tooth surface for transmission through bone structure to the person's cochlea.

22. Apparatus for communicating sound-related vibrations to the cochlea of an underwater diver comprising:

a mouthpiece for use in underwater breathing apparatus;

means for receiving acoustic signals and converting said acoustic signals to electrical audio driver signals;

transducer means mounted in the said mouthpiece of an underwater breathing device and adapted to be held in selectively compressible vibration-transmitting engagement with a surface of a tooth of a the diver and responsive to said input electrical audio driver signals for imparting corresponding vibratory signals to said tooth and hence to the ear and cochlea of the diver via facial bone structure;

engagement means for holding said mouthpiece-mounted transducer means in said vibration-transmitting engagement with said tooth surface; and connecting means for delivering said input electrical audio driver signals to said transducer means.

* * * * *